United States Patent

[11] 3,581,014

[72] Inventors  Alvin R. Vogel
 Los Angeles;
 Douglas A. Moore, Rolling Hills; Martin P. Folan, Long Beach; John R. Buck, Gardena, Calif.
[21] Appl. No. 9,644
[22] Filed Feb. 9, 1970
[45] Patented Aug. 17, 1971
[73] Assignee Northrop Corporation
 Beverly Hills, Calif.
 Continuation-in-part of application Ser. No. 656,425, July 27, 1967, now abandoned.

[54] INTEGRATED SYSTEM FOR REPORTING AIRCRAFT DATA
6 Claims, 4 Drawing Figs.
[52] U.S. Cl. .................................................. 179/100.1,
 340/27, 340/181, 340/221
[51] Int. Cl. ....................................................... G08b 3/10,
 G08g 5/00
[50] Field of Search ............................................. 340/27

[56] References Cited
UNITED STATES PATENTS
| | | | |
|---|---|---|---|
| 2,883,651 | 4/1959 | Akerlund ..................... | 340/181 |
| 3,015,702 | 1/1962 | Vogel ............................ | 179/100.2 |
| 3,327,067 | 6/1967 | Boniface ...................... | 179/100.1 |
| 3,471,652 | 10/1969 | Moore et al. ................. | 179/100.1 |

Primary Examiner—James W. Moffitt
Assistant Examiner—Raymond F. Cardillo, Jr.
Attorneys—Sokolski & Wohlgemuth and W. M. Graham ABSTRACT: Various aircraft parameters are sensed by function sensors, the outputs of these sensors being fed to a signal conditioner and evaluator where the signals are processed and the magnitudes of these various parameters evaluated. When the magnitude of any of these parameters is above or below certain predetermined limits, an output signal is fed to a transmitter which transmits a voice message indicating the out-of-limits condition. The occurrence of out-of-limit conditions for any of these parameters is also digitally encoded and recorded for future reference. Certain outputs of the signal evaluator and conditioner indicative of selected aircraft flight and operating conditions are continually fed to a digital data encoder where they are placed in suitable condition for recording in digital form and from where they are fed to a continually recycling recorder for recordation.

INTEGRATED SYSTEM FOR REPORTING AIRCRAFT DATA

This invention is a continuation in part of our application Ser. No. 656,423 filed July 27, 1967, now abandoned, for Integrated System for Reporting Aircraft Data.

This invention relates to a system for reporting aircraft data and more particularly to a system for sensing and processing information on aircraft operating conditions and simultaneously providing voice warning signals indicative of such conditions and recording certain of the sensed information on recorders for future utilization.

In flying high speed aircraft, especially military types, a great many parameters must be continually monitored and proper action taken when these parameters fall outside of predetermined limits. In addition, it is helpful in the maintenance of such aircraft to know when during a flight such parameters may have departed from normal operating range. Further, it is highly useful, especially in analyzing the causes of an air crash, to have complete information as to aircraft operating parameters during the period immediately preceding such a crash.

This invention involves a system for providing all of the three above enumerated functions in a coordinated and integrated fashion.

It is therefore an object of this invention to provide an integrated system for reporting and recording aircraft performance and operational data.

It is another object of this invention to provide an integrated data reporting system in which the operational data during the final portions of a flight are recorded.

It is another object of this invention to provide detailed aircraft operational data for maintenance and evaluation uses.

It is still another object of this invention to provide an integrated system for providing audio warning messages indicative of out-of-tolerance operational parameters while simultaneously recording such operational data.

Other objects of this invention will become apparent from the following description taken in connection with the accompanying drawings, of which:

In brief, the system of the invention utilizes a signal conditioner and evaluator which processes and evaluates a plurality of sensor outputs, each of which represents a different aircraft parameter. If any of these parameters are not within predetermined limits, the evaluator generates a control signal which actuates a particular corresponding transmitter unit in a voice warning message transmitter. The output of the message transmitter is in plain language and is played as a warning message to the flight personnel. Information as to out-of-limit aircraft parameters is also digitally encoded and recorded. Information from the signal conditioner and evaluator providing certain aircraft data is digitally encoded and recorded on a recycling recorder so that such information for the very last portions of the flight is always available. In addition, comments made by the aircrew at the time are also recorded. The system of the invention thus continuously monitors aircraft operating parameters and simultaneously provides immediate warning messages as well as a recordation of both failure information for use in aiding maintenance as well as information on aircraft performance parameters during the very last portions of a flight for use in evaluation such as, for example, in the event of a crash. This information, which may include detailed data on a large number of separate aircraft parameters, thus is made available to provide an immediate warning to the flight crew of a hazardous condition and at the same time is recorded to provide a thorough basis for detailed postflight review and/or accident analysis.

Figure 1:
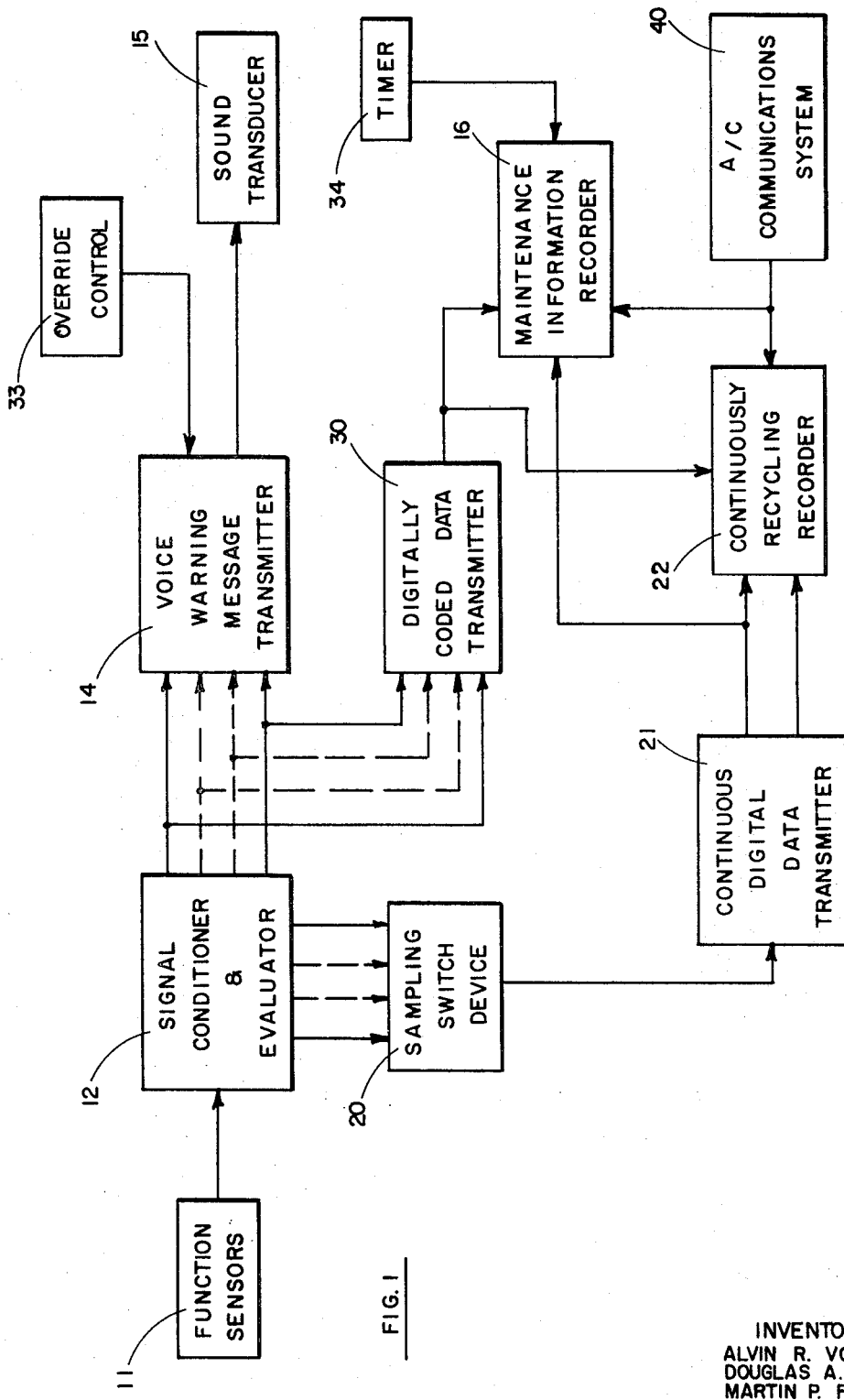
FIG. 1 is a block diagram of the basic system of the invention.

Referring now to FIG. 1, the basic system of the invention is illustrated. Function sensors 11 provide information, generally in the form of an electrical voltage, on a plurality of aircraft functions. The outputs of function sensors 11 are fed to signal conditioner and evaluator 12 which evaluates each of these sensor outputs against predetermined voltage ranges representing normal operation and generates an output control signal to voice warning message transmitter 14 whenever any of the sensor outputs do not fall within these predetermined ranges. Audio message transmitter 14 may comprise a unit such as described in U.S. Pat. No. 3,015,702 issued Jan. 2, 1962, and assigned to Northrop Corporation, the assignee of the instant application.

The message outputs of audio message transmitter 14 are fed to sound transducer 15 which provides audio warning signals to the aircraft operating personnel. The outputs of signal conditioner and evaluator 12 are also fed to digitally coded data transmitter 30 wherein they are converted to digital form and fed to both maintenance information recorder 16 and continuously recycling recorder 22 for recordation on these two recorders. Signal conditioner and evaluator 12 also has a special output which will provide continuous indication of the absolute values of certain aircraft performance parameters regardless of whether or not these parameters are within the predetermined "normal" ranges. These outputs which are of value in providing detailed data as to aircraft performance during the period monitored are fed to sampling switch device 20 from where they are sequentially fed to continuous digital data transmitter 21. The signals are appropriately processed in the digital data transmitter to produce a digital signal containing the data fed thereto.

The output of data transmitter 21 is fed to continuously recycling recorder 22 where it is appropriately recorded. Recorder 22 also records digitally encoded malfunction data from data transmitter 30 and audio messages transmitted on the aircraft communications system 40. Recorder 22 records over a predetermined time interval such as, for example, 30 minutes and then recycles, i.e., erases the data recorded, and simultaneously records the data received during the next such time interval. In this manner, the data for only the last portion of the flight is always provided. Maintenance information recorder 16 operates in conjunction with timer 34 to provide a time record as to when during the flight the various recorded failures have occurred. Maintenance information recorder 16 has at least four recording channels and also records the digitally coded message information on engine parameters from coded data transmitter 30 and the voice transmissions of the pilot and crew on aircraft communications system 40.

Figure 4:
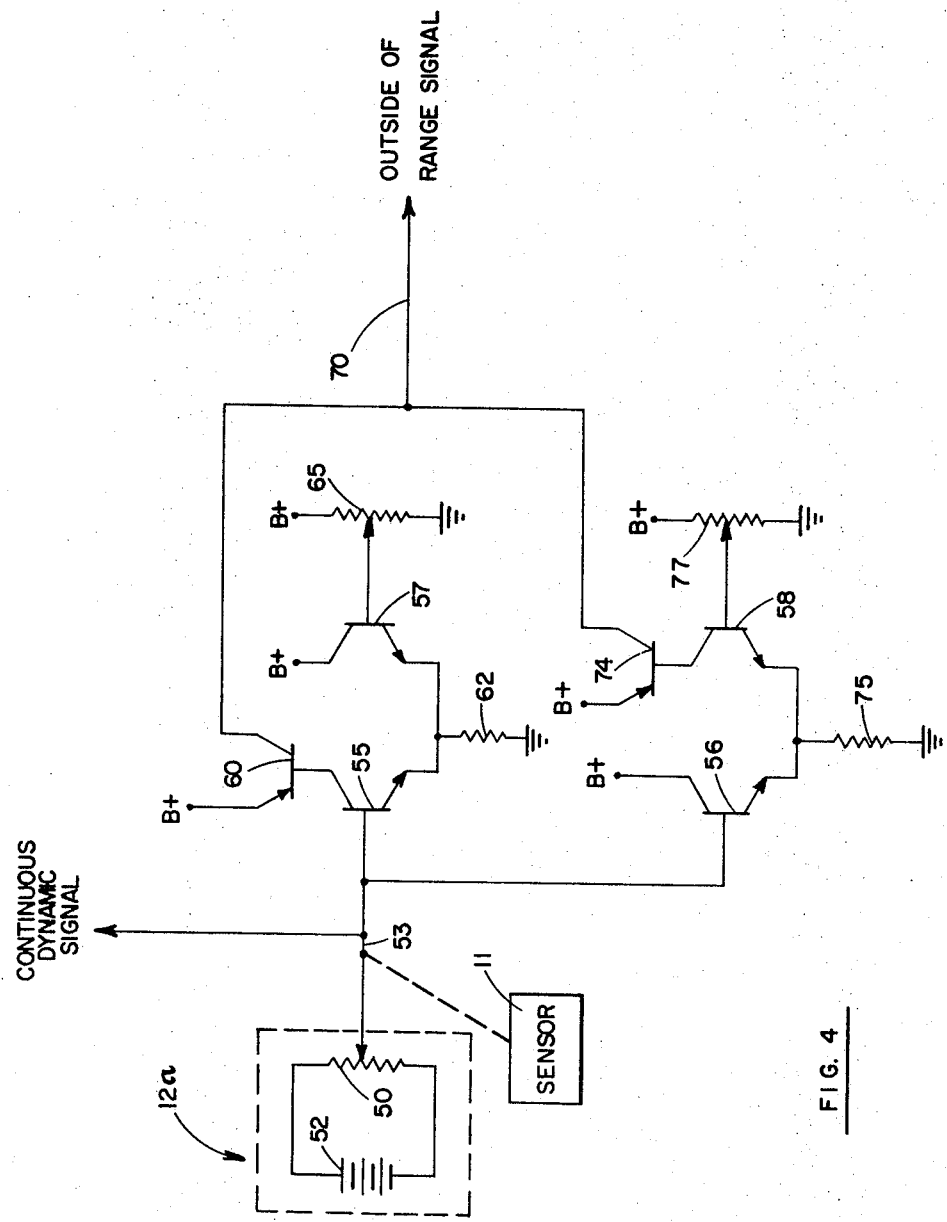
FIG. 4 is a schematic diagram illustrating typical signal conditioner and evaluator circuitry which may be utilized in the system of the invention.

Certain predetermined function sensor outputs received by signal conditioner and evaluator 12 from function sensors 11 are processed by the signal conditioner and evaluator, as to be described fully in connection with FIG. 4, to continually provide DC outputs in accordance with these sensed functions. These continuous outputs of signal conditioner and evaluator 13 which represent preselected aircraft flight and engine parameters, are fed from the signal conditioner and evaluator to sampling switch device 20. It is to be noted that the particular parameters fed to sampling switch 20 are continually received by this switch regardless of whether or not their values are within or outside of prescribed tolerances.

As to be explained in detail in connection with FIG. 3, the signals received by sampling switch device 20 are converted to digital form and each identified by a digitally coded signal, representing the particular parameter in question. These digital signals are fed to continuously recycling recorder 22 where they are recorded for future reference. Continuously recycling recorder 22 is a multichannel recorder which also records the output of the aircraft communications system 40 and of digitally coded data transmitter 30 and which records for a limited period of time, e.g., thirty minutes, and then erases the information recorded while it simultaneously records information received subsequently. Thus, recorder 22 compiles a record of information generated during the final portions of the flight which information could, for example, be that which was generated immediately preceding a crash. Recorders 16 and 22 and timer unit 34 may be of the type described in U.S. Pat. No. 3,471,652 issued Oct. 7, 1969, and assigned to Northrop Corporation, the assignee of the instant application. Override control 33 is utilized by the flight personnel to manually override the operation of message transmitter 14 where so desired.

Figure 2:
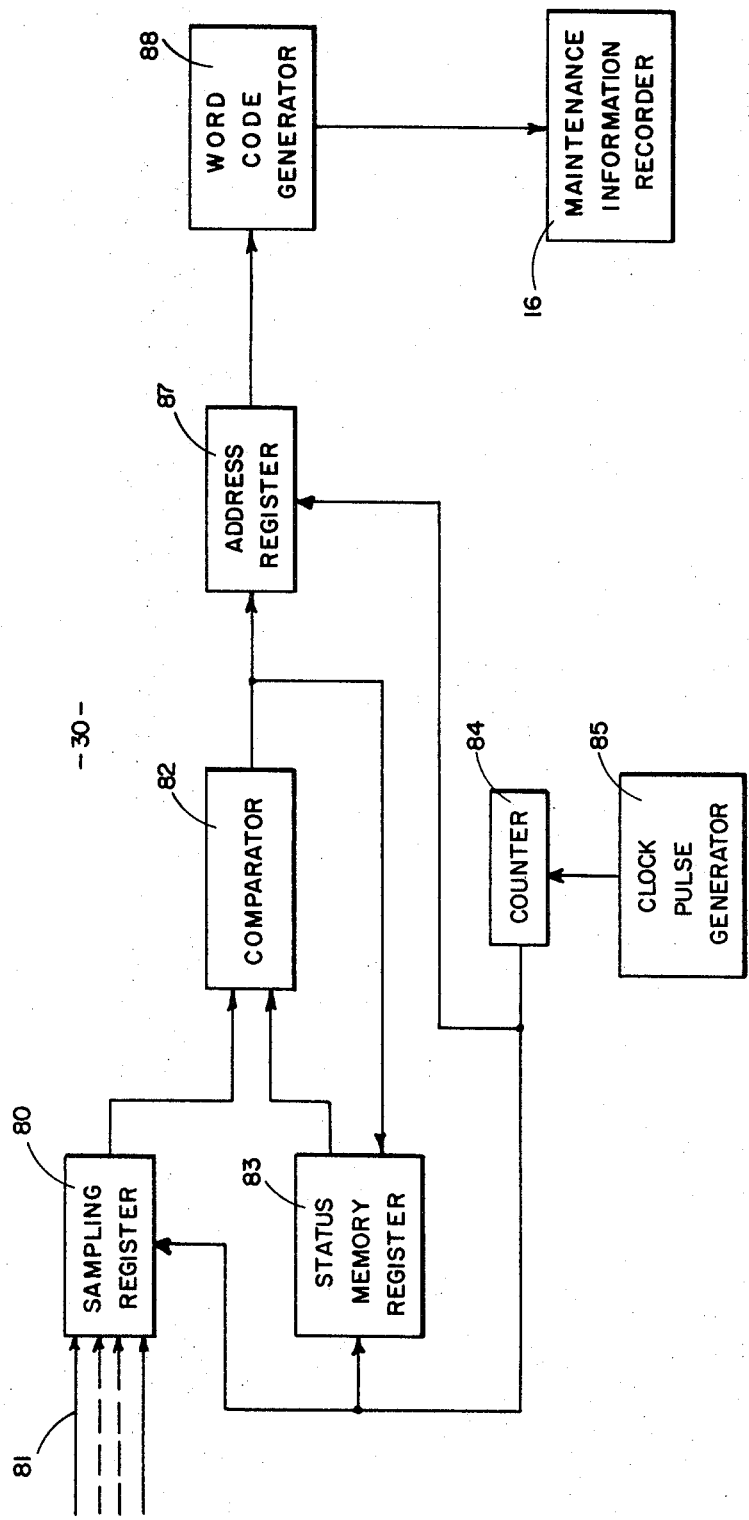
FIG. 2 is a block diagram of an embodiment of the digitally coded data transmitter of the invention.

Referring now to FIG. 2, a functional block diagram illustrating one embodiment of the digitally coded data transmitter 30 is shown. Signals from the signal conditioner and evaluator indicating out-of-range outputs from the function sensors are parallely fed on lines 81 to sampling register 80. Sampling register 80, which may comprise a shift register which receives lines 81 as inputs to its individual bits, is shifted in response to pulses received thereby from counter 82. The output of sampling register 80 thus comprises a pulse train which serially represents the parallel inputs fed to the sampling register. The output of the sampling is fed to comparator 82. Also fed to comparator 82 is the output of status memory register 83 which also may comprise a shift register which is shifted in response to the output of counter 84. Status memory register 83 does not having parallel inputs fed to its bits and therefore initially will generate only "0" outputs to comparator 82 in response to the shift pulses fed thereto from counter 84.

Counter 84 is operated in response to the output of clock pulse generator 85 and is utilized to synchronize the shifting of the two registers so that their outputs will successively indicate the states of each of the stages or bits thereof. In an initial comparison run, the bits of status memory register 83, as just noted are all in the "0" state. Therefore, the output of the register in response to the counter pulses will also be a series of "0" indications.

Any of the input lines 81 having signals thereon indicative of out-of-limit operation will actuate the associated bit of sampling register 80 to the "1" condition. These "1" bits will be reflected in the output of sampling register 80 which is fed to comparator 82. Comparator 82 is adapted to produce a "0" output when the inputs thereto are in coincidence and a "1" output when they are not. Thus with the initial appearance of a failure signal on any one of lines 81, comparator 82 will receive a "1" signal from register 80 and a "0" signal from register 83 and will therefore have a "1" output which is fed to address register 87. Address register 87, which is also synchronized with counter 84, passes this "1" output signal on to word code generator 88 where it receives a binary identification code associating it with the particular fault it represents. It is to be noted that the address register 87 provides the addresses for the word code generator in view of its synchronization with the sampling register 80 by means of counter 84, such synchronization enabling the address register to identify the signals fed thereto from the comparator by virtue of their time of appearance. The output of word code generator 88 is a binary coded signal, which in the case of the example just described, identifies the appearance of a fault and the nature of this fault, this binary coded signal being recorded in maintenance information recorder 16.

The output of comparator 82 is fed to status memory register 83 so that the "1" output signals from the comparator are utilized to drive the associated bits of the status memory register to the "1" condition. These register bits are thereby placed in agreement with the corresponding bits of the sampling register 80, thus effectively "memorizing" the status of the sampling register. Therefore on the next comparison of the bits of the registers, each pair of the corresponding bits in question will both be "1" and thus in agreement, the comparator now generating a "0" output. Let us assume that one of the faults should disappear thereby resulting in a "0" output from the corresponding bit of sampling register 80. Under these conditions, the sampling register will now have a "0" output, while the status memory register will have the memorized "1" output for this bit. This will be reflected by a "1" output from comparator 82. This change of state, indicating the removal of the failure will be appropriately recorded on maintenance information recorder 16.

Thus the system is capable of digitally recording the appearance of a fault, and the disappearance of such fault, the time of such appearance and disappearance being provided by the output signal from timer 34 (see FIG. 1).

Figure 3:
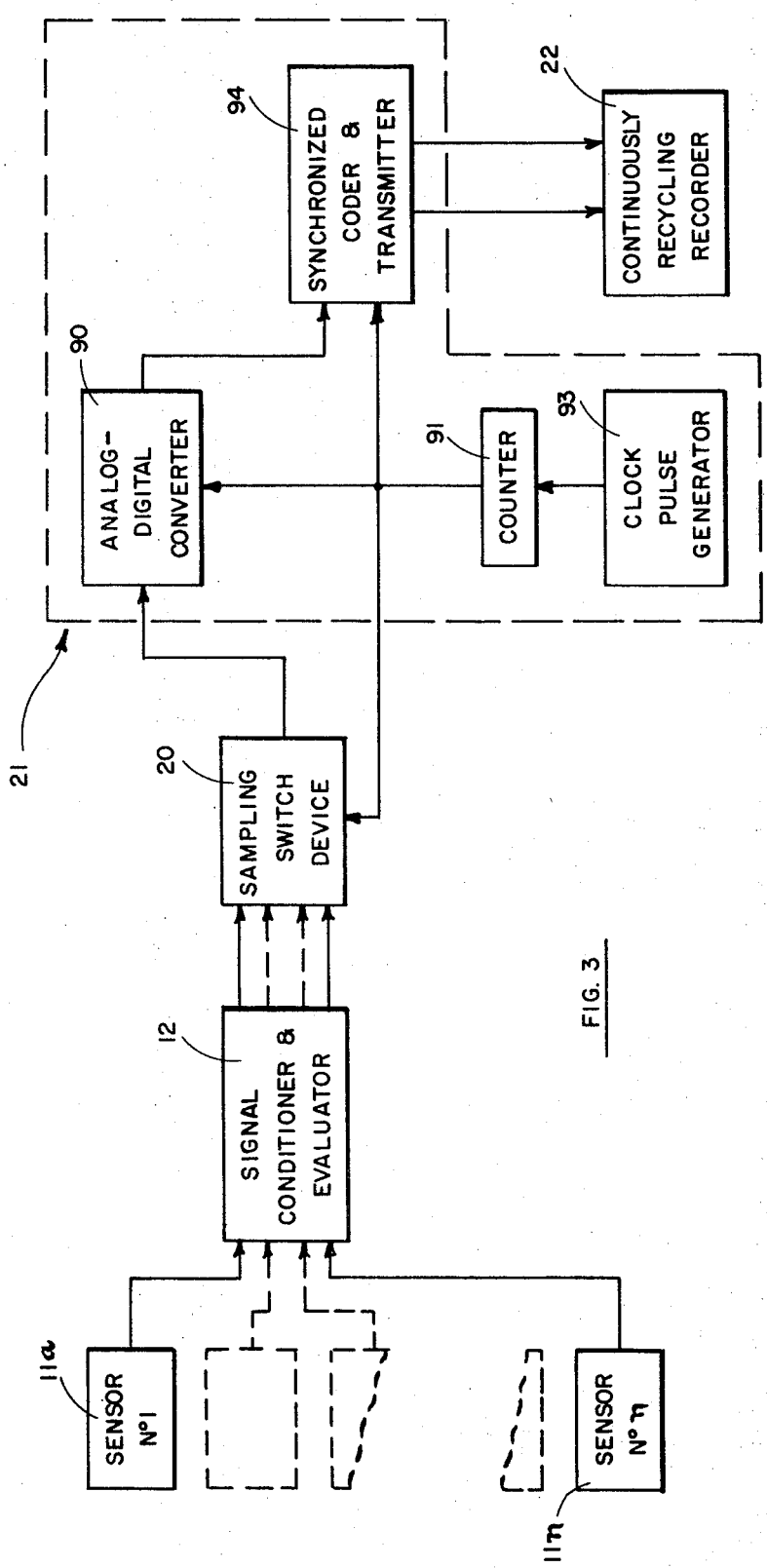
FIG. 3 is a block diagram of a continuous data transmitter unit that may be utilized in the preferred embodiment of the system of the invention.

Referring now to FIG. 3, a block diagram of a continuous data transmitter unit which may be utilized in the system of the invention is shown. The analog inputs to sampling switch device 20, which have amplitudes representing various parameters, are sequentially fed to analog-digital converter 90 in response to counter pulses fed thereto from counter unit 91. Counter unit 91 is driven in response to pulses received thereby from clock pulse generator 93, this counter controlling the synchronous operation of sampling switch device 20, analog-digital converter 90, and synchronized coder and transmitter 94. Analog-digital converter 90 which may for example be of the successive approximation type, converts the analog signals fed thereto to binary coded digital form, these binary coded signals being successively fed to synchronized coder and transmitter 94. Coder and transmitter 94 provides a digital address for each of the signals, this address being identified by virtue of the synchronization pulse provided from counter 91. Digitally coded signals representing engine and flight parameters are separately fed to continuously recycling recorder 22 for recordation thereon.

Referring now to FIG. 4, a schematic diagram of a signal conditioner and evaluator which may be utilized in the system of the invention is illustrated. The particular circuit shown is illustrative of only one of many that may be utilized. Sensor 11 which may comprise a float mechanism for measuring fluid level, such as for example a fuel or oil gauge, or an electrical meter movement sensing an electrical signal, mechanically drives the arm of potentiometer 50. Potentiometer 50 is connected across DC power source 52 so that as the arm of potentiometer 50 is driven by sensor 11 a DC potential is developed on line 53 which is in accordance with the output of sensor 11. The signal on line 53 is utilized to provide continuous dynamic information in accordance with the output of sensor 11. The signal on line 53 is utilized to provide continuous dynamic information in accordance with the output of sensor 11, which may be multiplexed as described in connection with FIG. 3 for recordation. The signal on line 53 is also fed as an input signal to transistors 55 and 56. Transistor 55 operates in conjunction with transistor 57 as a differential voltage comparator which generates an output signal when the input to transistor 55 rises above a predetermined voltage level. Transistor 56 operates in conjunction with transistor 58 to generate an output signal when the input to transistor 56 falls below a predetermined voltage level.

Such operation is achieved in the following manner: Transistor 55 is biased so that it is at cutoff if the voltage level on line 53 is below the predetermined reference level which represents the upper limits of the "normal" operating range of the parameter being measured. When transistor 55 is at cutoff so also is transistor 60 in view of the fact that its base is connected to the collector of transistor 55. With transistor 60 at cutoff, no current flows from this transistor to output line 70. Transistor 55 receives its bias through resistor 62. Register 62 is connected in the conduction path of transistor 57. The amount of conduction of transistor 57 and thus the biasing voltage developed across register 62 is determined by the setting of the arm of reference potentiometer 65. Transistor 57 is biased so that it conducts for all settings of potentiometer 65. Thus the voltage level at which transistor 55 will go to conduction is determined by the setting on reference potentiometer 65, and in this manner the upper limits of the "normal" operating range for the particular parameter in question may be calibrated. Thus, when the signal on line 53 rises above a predetermined voltage level indicating that the parameter being measured has risen above normal operational limits, transistor 55 is driven to the conductive state and drives transistor 60 to the conductive state to provide an output signal on line 70.

Transistors 56 and 58 operate in similar fashion in conjunction with transistor 74 to provide a signal on line 70 when the voltage level on line 53 falls below the predetermined lower limits established for this "normal" operating range. In this case, however, transistor 58 is normally at cutoff and transistor 56 is normally conducting, transistor 74 being driven by transistor 58. Transistor 58 is biased by means of reference potentiometer 77 to establish a predetermined bias across resistor 75 so that when the voltage on line 53 falls below a predetermine level, transistor 56 will go to cutoff thereby causing transistor 58 to go to conduction. When transistor 58 goes to conduction it drives transistor 74 to the conductive state, thereby providing a signal on line 70.

The system of this invention thus provides means for simultaneously providing voice warning message information to the operating personnel of an aircraft while recording such information for future utilization for maintenance and evaluation purposes.

While the system of this invention has been described and illustrated in detail, it is to be clearly understood that this is intended by way of illustration and example only and is not to be taken by way of limitation, the spirit and scope of this invention being limited only by the terms of the following claims.

We claim:

1. An integrated system for reporting aircraft data comprising:
    a plurality of function sensors for sensing preselected aircraft parameters,
    means for conditioning said function sensor outputs to generate separate electrical signals in accordance with each of said outputs,
    means for separately evaluating said electrical signals and generating a corresponding control signal when any one of said outputs is not within a predetermined ranged,
    voice message transmitter means responsive to said control signals for transmitting voice messages for each of said sensor outputs not within said predetermined range,
    digitally coded date transmitter means responsive to said control signals for sequentially generating digitally coded signals indicating each of said sensor outputs not within said predetermined range,
    maintenance information recorder means for recording the output of said coded data transmitter, means,
    continuous digital data transmitter means for sequentially generating digitally coded signals in accordance with preselected ones of the electrical signal outputs of said conditioning means, and
    automatically recycling recorder means for continuously recording the outputs of said last-mentioned means which occurred only during a predetermined immediately preceding period of operation.

2. The system as recited in claim 1 wherein said electrical signals are DC voltages having magnitudes corresponding to said sensor outputs.

3. The system as recited in claim 1 wherein said maintenance information recorder means comprises a multichannel recorder for simultaneously recording engine parameter outputs of said continuous digital data transmitter means and the output of said coded message transmitters.

4. The system as recited in claim 1 and additionally including an aircraft communications system for transmitting voice messages, the output of said communications system being simultaneously recorded on said maintenance information recorder means and said recycling recorder means.

5. The system as recited in claim 1 wherein said digitally coded data transmitter means comprises sampling register means for sequentially sampling the outputs of said evaluating means, status memory register means for memorizing the last previous outputs of said sampling register and comparator means for comparing the outputs of said two register means and generating a signal indicative of the coincidence of noncoincidence of said two register means outputs, and means responsive to the output of said comparator means for generating a coded digital signal for recordation on said maintenance information recorder means.

6. An integrated system for reporting inflight aircraft data comprising:
    a plurality of function sensors for sensing preselected aircraft parameters,
    means for processing said function sensor outputs to generate separate electrical signals in accordance with each of said outputs,
    means for separately evaluating said electrical signals and generating a corresponding control signal when at any one of said outputs is not within a predetermined range,
    voice warning message transmitter means responsive to said control signals for transmitting voice messages for each of said sensor outputs not within said predetermined range,
    sound transducer means responsive to the output of said message transmitter means for providing voice warning messages in accordance therewith,
    recorder means for recording preselected ones of said audio message Outputs of said transmitter means,
    means responsive to the control signal outputs of said evaluating means for generating sequential digital signals in accordance therewith,
    recorder means for recording said sequential digital signals,
    means for generating digital signals in accordance with preselected electrical signal outputs of said processing means, and
    automatically recycling recorder means for continuously recording the last-mentioned digital signals appearing only during an immediately preceding period of operation.

PO-1050
(5/69)

UNITED STATES PATENT OFFICE
CERTIFICATE OF CORRECTION

Patent No. 3,581,014      Dated May 25, 1971

Inventor(s) ALVIN R. VOGEL, DOUGLAS R. MOORE, MARTIN P. FOLAN, JOHN R. BUCK

It is certified that error appears in the above-identified patent and that said Letters Patent are hereby corrected as shown below:

On the title page, the date of the patent should be changed to MAY 25, 1971.

Signed and sealed this 16th day of May 1972.

(SEAL)
Attest:

EDWARD M. FLETCHER, JR.                ROBERT GOTTSCHALK
Attesting Officer                    Commissioner of Patents